(12) United States Patent
Castellanos

(10) Patent No.: US 9,416,895 B2
(45) Date of Patent: Aug. 16, 2016

(54) ATTACHMENT SYSTEM FOR SUPPORTING A PIPE

(71) Applicant: Jose Oscar Castellanos, Orange, CA (US)

(72) Inventor: Jose Oscar Castellanos, Orange, CA (US)

(*) Notice: Subject to any disclaimer, the term of this patent is extended or adjusted under 35 U.S.C. 154(b) by 0 days.

(21) Appl. No.: 14/090,535

(22) Filed: Nov. 26, 2013

(65) Prior Publication Data
US 2015/0144747 A1    May 28, 2015

(51) Int. Cl.
F16L 25/04    (2006.01)
F16L 3/10    (2006.01)
F16L 3/04    (2006.01)
F16L 3/24    (2006.01)
F16L 3/16    (2006.01)
F16L 3/18    (2006.01)
F16L 3/02    (2006.01)
F16L 3/12    (2006.01)
B25B 5/14    (2006.01)

(52) U.S. Cl.
CPC ............... F16L 3/1091 (2013.01); B25B 5/147 (2013.01); F16L 3/02 (2013.01); F16L 3/04 (2013.01); F16L 3/1211 (2013.01); F16L 3/1218 (2013.01); F16L 3/16 (2013.01); F16L 3/18 (2013.01); F16L 3/24 (2013.01); F16L 25/04 (2013.01); Y10T 24/1437 (2015.01); Y10T 29/49826 (2015.01); Y10T 403/4614 (2015.01)

(58) Field of Classification Search
CPC .................................................... F16L 3/1091
See application file for complete search history.

(56) References Cited

U.S. PATENT DOCUMENTS

| | | | | | |
|---|---|---|---|---|---|
| D26,639 | S | * | 2/1897 | Stivers | D12/20 |
| 1,887,193 | A | * | 11/1932 | Buchanan | 439/208 |
| 2,029,149 | A | * | 1/1936 | Barnes | 439/777 |
| 2,103,811 | A | * | 12/1937 | Davis | 248/55 |
| 2,288,158 | A | * | 6/1942 | Ellinwood | 174/135 |
| 2,956,103 | A | * | 10/1960 | Steel | F16L 3/1091 174/40 CC |
| 3,036,802 | A | * | 5/1962 | Kitchell | 108/51.3 |
| 3,058,087 | A | * | 10/1962 | Piasecki | H01R 4/46 439/100 |
| 3,227,406 | A | * | 1/1966 | Shelton et al. | 248/74.4 |
| 3,604,676 | A | * | 9/1971 | Weber | 248/68.1 |
| 3,605,214 | A | * | 9/1971 | Spotts | F01N 13/1805 24/277 |
| 3,919,747 | A | * | 11/1975 | Offterdinger | F01N 13/1805 24/277 |

(Continued)

FOREIGN PATENT DOCUMENTS

AT    EP 2562459 A1 *    2/2013    ............ F16L 3/1207
CH    700182 B1 *    7/2010

(Continued)

OTHER PUBLICATIONS

Alduco, Offshore Corrosion Control Solutions—I-Rod Strips, Jan. 14, 2012, website: www.alduco.com/aes/offshore_corrosion_control/irod.html.*

(Continued)

Primary Examiner — Joshua J Michener
Assistant Examiner — Chiedu Chibogu
(74) Attorney, Agent, or Firm — One LLP

(57) ABSTRACT

Attachment plates and systems for pipe support interfaces are disclosed. According to one embodiment, system for pipe-support interface, having a pipe, a pipe support, and a low-friction surface between the pipe and pipe support, includes an improvement comprising a plate in an interface between the low-friction surface and the pipe support, the plate constructed of a corrosion resistant material, the plate having a recessed area for receiving the low-friction surface.

9 Claims, 6 Drawing Sheets

(56) References Cited

U.S. PATENT DOCUMENTS

| | | | | |
|---|---|---|---|---|
| 4,167,033 | A | * | 9/1979 | Fletcher .................. 362/396 |
| 4,372,017 | A | * | 2/1983 | Heckethorn ........ F01N 13/1805 24/277 |
| 5,028,149 | A | * | 7/1991 | Hardtke .................... 384/46 |
| 5,044,584 | A | * | 9/1991 | Lin ........................ 248/68.1 |
| D347,163 | S | * | 5/1994 | Issard ........................ D8/387 |
| 6,499,608 | B1 | * | 12/2002 | Sterling ............... A47B 96/027 211/70.1 |
| 7,845,597 | B2 | * | 12/2010 | Gatta ...................... B60R 9/055 248/57 |
| 8,959,846 | B2 | * | 2/2015 | Polzin ...................... E04H 7/22 52/506.05 |
| 2004/0118467 | A1 | * | 6/2004 | Pirart ................... F16L 3/1091 138/99 |
| 2006/0249636 | A1 | * | 11/2006 | Thiedig ................ F16L 3/1091 248/74.4 |
| 2007/0068588 | A1 | * | 3/2007 | Britton ..................... 138/106 |
| 2009/0212170 | A1 | * | 8/2009 | Riibe et al. .................... 248/58 |
| 2012/0181396 | A1 | * | 7/2012 | Simmons et al. ............... 248/72 |
| 2012/0214328 | A1 | * | 8/2012 | Downing ................ F16L 3/00 439/345 |
| 2013/0320157 | A1 | * | 12/2013 | Carter ..................... F16L 3/12 248/68.1 |
| 2014/0332641 | A1 | * | 11/2014 | Wilson et al. .................. 248/71 |

FOREIGN PATENT DOCUMENTS

| | | | |
|---|---|---|---|
| DE | 2517745 | A1 * | 10/1975 |
| DE | ES 2021226 | A6 * | 10/1991 |
| DE | 4311924 | A1 * | 10/1994 |
| DE | EP 0620395 | A1 * | 10/1994 |
| DE | 9414096 | U1 * | 12/1994 |
| DE | 19701526 | C1 * | 9/1998 |
| DE | 19758418 | C1 * | 9/1998 |
| GB | 426415 | A * | 4/1935 |
| GB | 1422446 | A * | 1/1976 |
| GB | 1530284 | A * | 10/1978 |
| GB | 2175667 | A * | 12/1986 |
| JP | EP 2634467 | A1 * | 9/2013 |

OTHER PUBLICATIONS

Doughty Engineering, U Bolts, Mar. 24, 2007, Website: http://web.archive.org/web/20070324134733/http://www.doughty-en.*

S3i, U Bolt, Jan. 22, 2011, Website: http://web.archive.org/web/20110122141026/http://www.s3i.co.uk/.*

Pipingtech, Technical Bulletins: Hold Downs, Nov. 15, 2010, Website: http://web.archive.org/web/20101115013247/http://www.pipingtech.*

Mifab, C-PORT Roof Pipe Supports, Nov. 16, 2012, Website: http://web.archive.org/web/20121116160540/http://www.mifab.com/.* aaatech, CP-1000 Hold Down Clamp, May 6, 2011, Website: http://web.archive.org/web/20110506042643/http://www.aaatech.co.* qsl, Assembly of the Lightningbolt Quad, Nov. 14, 2004, Website: http://web.archive.org/web/20041114043018/http://www.qsl.net/w3.*

Warkus, C., Pipe holder, EP 2562459 A1, Feb. 27, 2013, Machine Translation.*

Reinhard, K., Fixture for attaching pipe to building surface, DE 19758418 C1, Sep. 17, 1998, Machine Translation.*

* cited by examiner

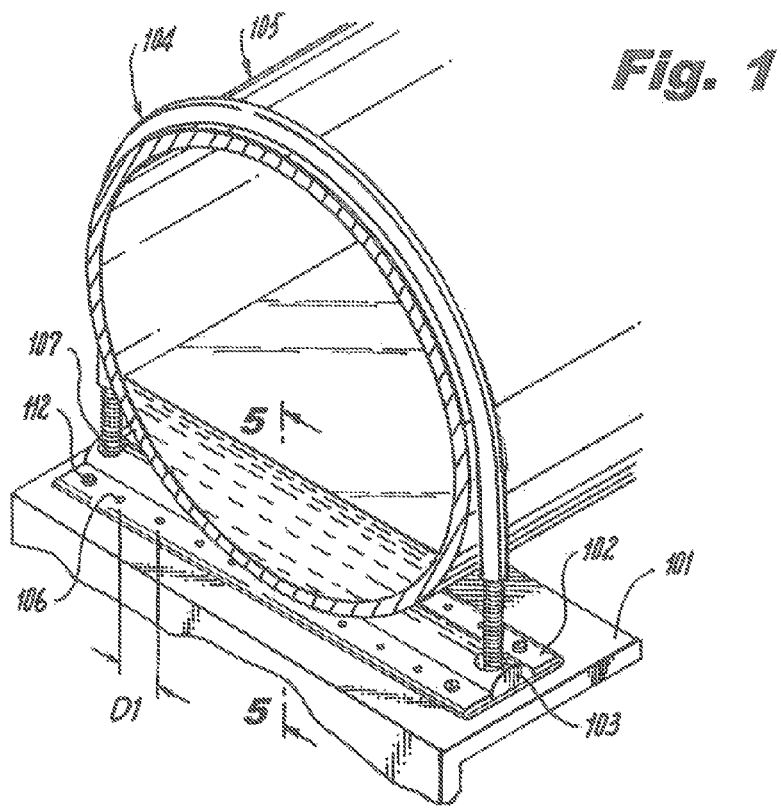
Fig. 1
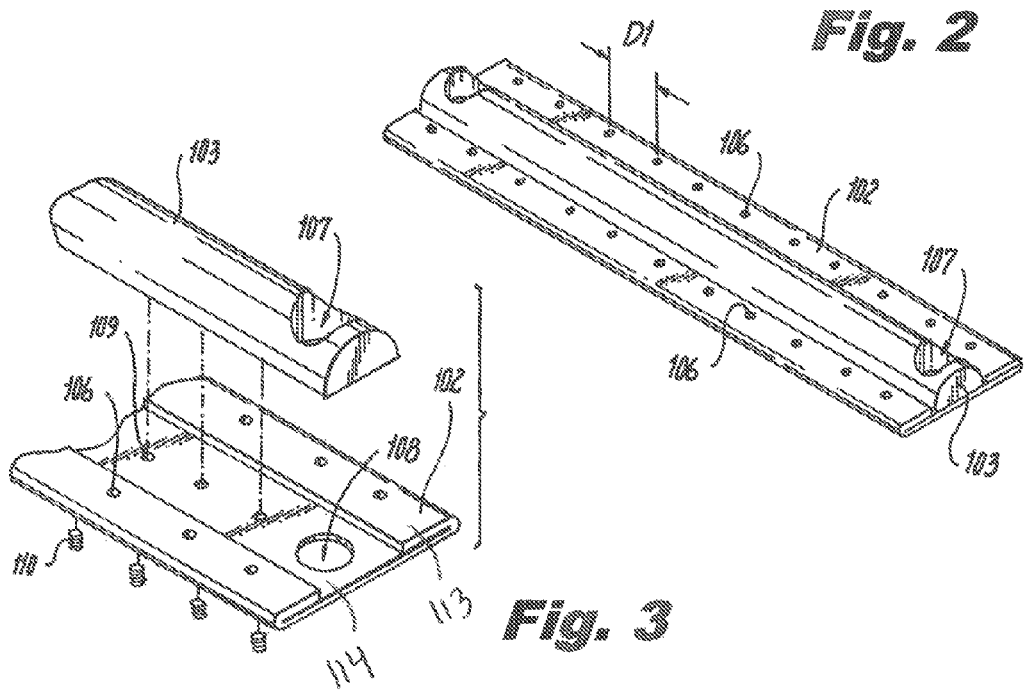
Fig. 2
Fig. 3

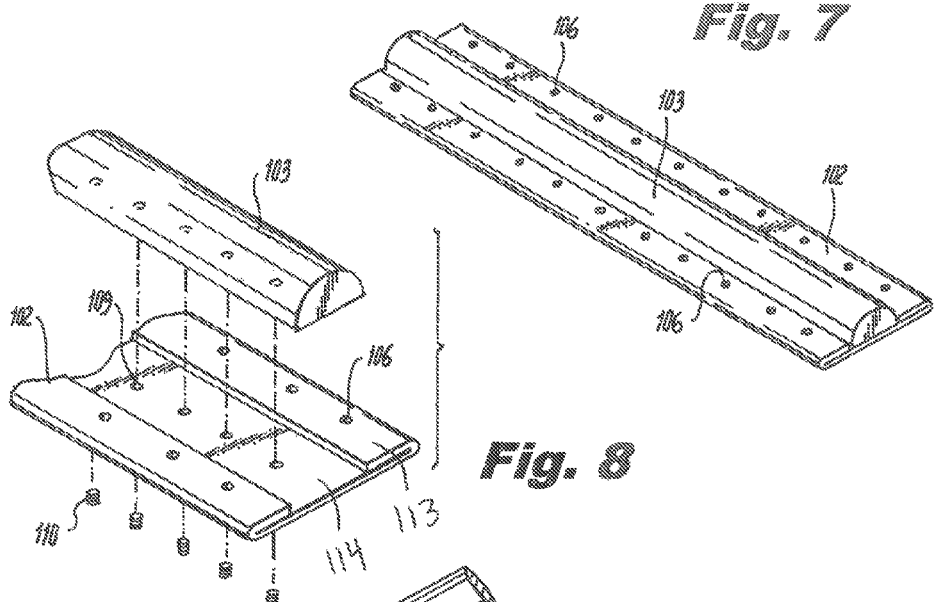
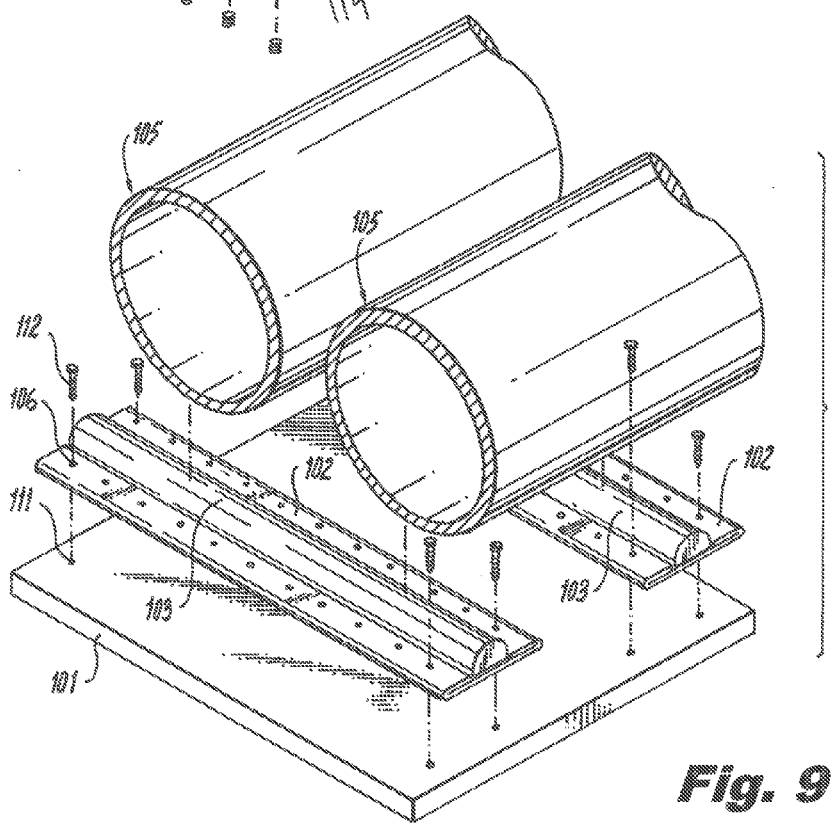

ATTACHMENT SYSTEM FOR SUPPORTING A PIPE

FIELD

The embodiments relate generally to systems used at the junction of pipes and pipe supports. More specifically, the subject matter described herein relates to a low corrosion interface between a pipe and a pipe support including an attachment plate to facilitate installation of a low friction surface at the interface.

BACKGROUND

Pipes have been used for many years to transport liquids, such as water and fuel, as well as gases, such as natural gas and methane. Traditionally, pipes have been buried or laid on the open surface of the ground. However, direct contact of the pipe with earth and other elements of nature increased the rate of corrosion at the pipe surface.

A solution to corrosion resulting from burying or lying pipes on the ground has been to prop them above the ground or an underground surface. Generally, they are held above the ground by supports made of cement, concrete, metal or other materials. This greatly reduces (or eliminates) the pipe-ground contact area and allows air (or other material) to insulate the outer pipe surface. It also reduces or prevents entirely direct contact of the pipe with soil containing moisture and/or reactive agents in the soil.

Unfortunately, supporting pipes above the ground has drawbacks. For example, use of supports creates periodic support-pipe interfaces that in some cases became the focal point of greatest corrosion, wear and leakage and, potentially, complete failure. Small or large vibrations causes movement of the pipe relative to the support and would, over time, create frictional wear at the point of contact. Indeed, corrosion at pipe supports is one of the leading causes of process pipe failures, which can have potentially serious consequences, such as oil spills.

In addition, many pipe support designs, such as beam supports and pipe saddles, have crevices where water is trapped and held in direct contact with the pipe surface. Once corrosion is initiated in these areas, it can quickly undercut the anti-corrosive coating, paint or film and cause rapid wall loss and create exposed, outer pipe surface area that is vulnerable to the elements. If these conditions are not addressed, entire sections of pipe can prematurely require replacement or, worse yet, leak or fails entirely.

Beam supports and saddle clamps have historically caused the majority of problems. They have these undesirable features in common:
  Crevices—the formation of a crevice at the pipe surface;
  Water entrapment—water is trapped and held in constant contact with the pipe surface;
  Poor inspectability—these supports are virtually impossible to paint or maintain, and visual inspections and NDT are often difficult; and
  Galvanic couples—even when both the pipe and the support are the same steel, the metallurgical differences can still provide enough potential to drive a galvanic corrosion cell.

Corrosion and wear problems occurring at the pipe-support interface have been previously addressed by interposing a low-friction surface. A commonly used surface is a thermoplastic, semi-cylindrical rod, such as the product sold as the IROD. The IROD is intended to provide a low-friction surface at the point of greatest frictional wear between the support and the outside surface of the pipe being supported.

Systems and methods of installing the IROD, and maintaining it in place, have been problematic. For example, the low-friction surface was held in place at either end by the ends of the U-bolt that also held the pipe to the support. This subjected the low-friction surface to flexing between the ends.

Also, because the U-bolt was relatively thick, the holes through the low-friction surface were relatively large as compared to the width of the surface. This posed the potential of the end of the U-bolt working through the edge of the low-friction surface. If this occurred, the low-friction surface could pivot out of position and allow the pipe to contact the upper surface of the support. As discussed above, this would expose the pipe surface to even higher potential rates of corrosion, wear, leakage and failure.

To prevent flex, and failure of the connection of U-bolt to low-friction surface at one end, the low-friction surface was bolted or screwed into the cement upper surface of the support. This is awkward and difficult. It also introduces new areas of potential wear and corrosion, at the bolt/screw-cement interface. Moisture can be trapped in these areas under the low-friction surface. If the bolt/screw failed, this would potentially prejudice the position of the low-friction surface relative to the pipe-support interface. If the low-friction surface was to be displaced from its position between the support and the pipe, the pipe would again be exposed to focused areas of corrosion, wear, leakage and potential failure.

From the discussion that follows, it will become apparent that the present invention addresses the deficiencies associated with the prior art while providing numerous additional advantages and benefits not contemplated or possible with prior art constructions.

SUMMARY

An attachment plate and system for pipe-support interfaces is disclosed herein that addresses difficulties of installation of the low-friction surface and reduces the risk of displacement of the surface during the service life of the pipe-support interface. It is an object of the disclosed subject matter to provide an improved connection for the low-friction surface to the support.

It is another object of the disclosed subject matter to increase the integrity and service life of the low-friction surface.

It is a further object of the disclosed subject matter to provide an apparatus that will facilitate installation of the low-friction surface at the pipe-support interface.

It is yet another object of the disclosed subject matter to provide an apparatus that assists installation of the low-friction surface, but also can be easily sized for installation at the work site.

Other and additional objects will be apparent from the discussion herein.

According to one embodiment, a system a low-friction surface between a pipe and a support includes an improvement comprising a plate between the low-friction surface and the support. The plate has a recessed area for receiving and holding the low-friction surface, a plurality of holes in the portion between the low-friction surface and the upper portion of the support to hold the low-friction surface to the plate, and a plurality of holes along its periphery for bolts or screws to hold the plate to the upper portion of the support. The plate is constructed of a corrosion resistant material.

The systems, methods, features and advantages of the invention will be or will become apparent to one with skill in the art upon examination of the following figures and detailed description. It is intended that all such additional methods, features and advantages be included within this description, be within the scope of the invention, and be protected by the accompanying claims. It is also intended that the invention is not limited to require the details of the example embodiments.

BRIEF DESCRIPTION OF THE DRAWINGS

The accompanying drawings, which are included as part of the present specification, illustrate the presently preferred embodiment and, together with the general description given above and the detailed description of the preferred embodiment given below, serve to explain and teach the principles of the present invention. In the figures, like reference numerals designate corresponding parts throughout the different views.

FIG. 1 illustrates a perspective view of an exemplary system according to one embodiment of the present disclosure, shown in use.

FIG. 2 illustrates a perspective view of an exemplary plate and thermoplastic rod for use with the present system, according to one embodiment prior to installation.

FIG. 3 illustrates an exploded view of a portion of an exemplary plate and thermoplastic rod for use with the present system, according to one embodiment.

FIG. 7 illustrates a perspective view of another exemplary plate and thermoplastic rod for use with the present system, according to the embodiment depicted in FIG. 9.

FIG. 8 illustrates an exploded view of a portion of the exemplary plate and thermoplastic rod of FIG. 7 for use with the present system, according to the embodiment depicted in FIG. 9.

FIG. 9 illustrates an exploded perspective view of yet another exemplary system, according to another embodiment of the present disclosure.

Figure 4:
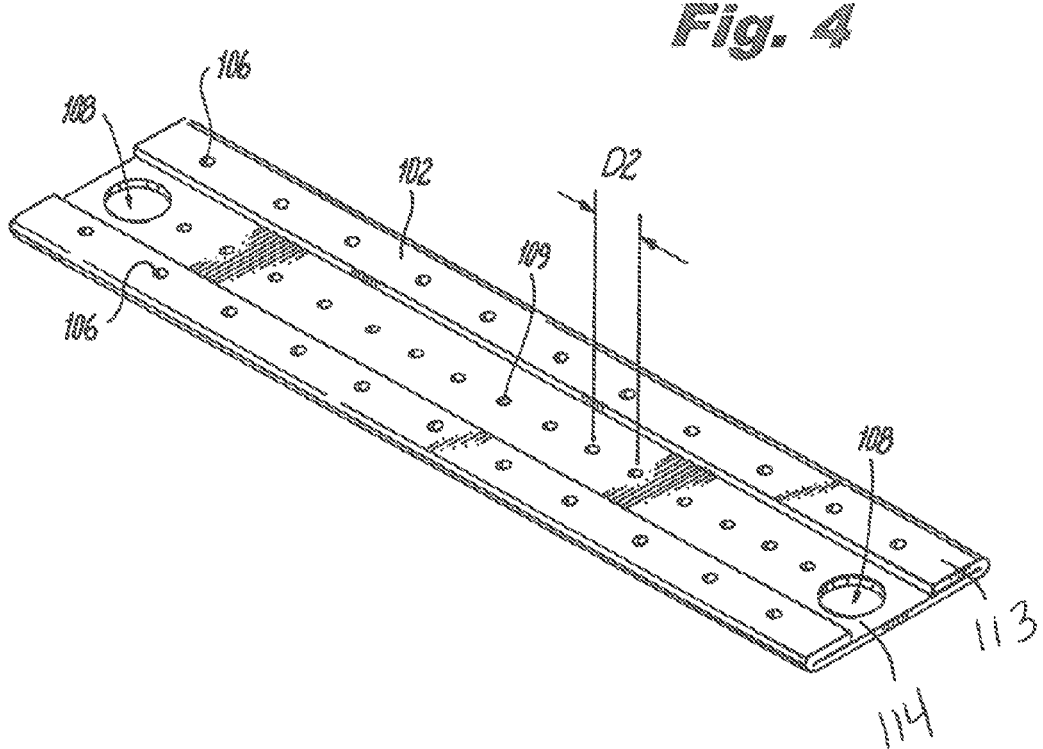
FIG. 4 illustrates an exemplary plate for use with the present system, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DETAILED DESCRIPTION OF PREFERRED EMBODIMENTS

Embodiments disclosed herein are directed to improvements in the installation of pipe supports and in particular the installation of the low-friction surface at the pipe-support interface. As discussed above, corrosion at the pipe-support interface is a leading cause of process piping failures. Solutions involve placing a low-friction, thermoplastic rod between a pipe and pipe support. This reduces the risk of cracking in the pipe due to frictional rubbing and vibrations, however can introduce cracking resulting from slight movement of the thermoplastic rod over time because the thermoplastic rod is not securely attached to the pipe support.

Typically, the low-friction surface is secured between the pipe and support with the ends of a bolt that wraps around and holds the pipe to the support. However, because this installation technique locates the points of attachment at the ends of the low-friction, thermoplastic rod, the thermoplastic rod flexes in between bolts. Adding bolts to hold the bottom of the rod to the support is awkward and difficult for installation, and presents the potential for more corrosion at the bolt-support interface.

According to one embodiment contemplated herein, a thermoplastic rod is affixed to a plate made of corrosion resistant material. The thermoplastic rod, along with the plate, is affixed to a pipe support, and a pipe can rest atop the thermoplastic rod. The improvement provided herein is a more reliable support system that remains in place regardless of pipe vibration, while preventing corrosion.

An exemplary corrosion resistant plate can be implemented using placement of a single plate or multiple. It will be appreciated that the plate can be manufactured from any corrosion resistant material that is strong enough to not break under pipe conditions. An example of a corrosion resistant material is 14 gauge galvanized material. An example height of the corrosion resistant plate is $\frac{1}{16}$inch.

An exemplary thermoplastic rod is a durable, high-impact, extruded thermoplastic cut into a half-round rod. It is available in 10-foot lengths or cut-and-drilled for use with standard-size pipe U-bolts. For example only, there can be three different diameter sizes for the thermoplastic rod: $\frac{3}{4}$inch, 1 inch, and $\frac{1}{2}$inch, as well as a high-temperature version for process piping operating above 200 °F.

Applications of the present system and method include any pipeline system, including pipelines related to for example only crude oil, refined systems, jet fuel, diesel fuel, and ethanol.

FIG. 1 illustrates a perspective view of an exemplary system according to one embodiment of the present disclosure. According to one embodiment, a plate 102 resides between a thermoplastic rod 103 and the support 101. The plate 102 and the rod 103 have corresponding, relatively large, pipe-securing U-bolt holes 107 at each end. This affixes the plate 102 and the rod 103 together, and the corrosion resistant protective plate 102 in place between the rod 103 and the support 101.

Plate-support holes 106 are drilled in the corrosion resistant plate 102 such that the plate 102 can be affixed using screws 112 to the pipe support 101. The holes 106 are evenly spaced along the metal plate 102, separated by a distance D1. A pipe 105 rests atop the thermoplastic rod 103 and corrosion resistant plate 102 assembly, and a U-bolt 104 secures the pipe to the assembly. The pipe support 101 is a flat surface, ideally.

FIG. 2 illustrates a perspective view of an exemplary plate and thermoplastic rod for use with the present system, according to one embodiment. An exemplary corrosion resistant plate 102 has holes 106 along each of its outer sides, the holes 106 equally spaced along the plate 102 by a distance D1. A thermoplastic rod 103 having holes 107 is affixed to the corrosion resistant plate 102. In other embodiments, the thermoplastic rod 103 is without holes 107.

FIG. 3 illustrates an exploded view of an exemplary plate and thermoplastic rod for use with the present system, according to one embodiment. As mentioned earlier, the corrosion resistant plate 102 includes a hole, now visible as hole 108, for passing of the threaded end of a U-bolt. The plate 102 is made from a single plate of corrosion resistant material, and includes a recessed area 114 (recessed in comparison to outer flaps 113) for placement of the thermoplastic rod 103. The recessed area 114 minimizes shifting of the thermoplastic rod 103.

The thermoplastic rod 103 includes a hole 107 for passing of a U-bolt, and the thermoplastic rod 103 is aligned with the metal plate 102 such that hole 107 lines up directly over hole 108. The holes 106 in the metal plate 102 are along the outer edges of the metal plate 102. The thermoplastic rod 103 is affixed to the plate 102 via holes 109 using screws 110.

FIG. 4 illustrates an exemplary plate for use with the present system, according to one embodiment. A corrosion resistant plate 102 includes a hole 108 for passing of a U-bolt. The plate 102 is made from a single plate of corrosion resistant material, and includes a recessed area 114 (recessed in comparison to outer flaps 113). The plate 102 includes holes 106 along the outer edges of the plate 102, as well as holes 109 down the center of the plate 102. Holes 109 are equally spaced along the plate 102, separated by a distance D2. In other embodiments, the plate 102 is without holes 108.

Figure 5:
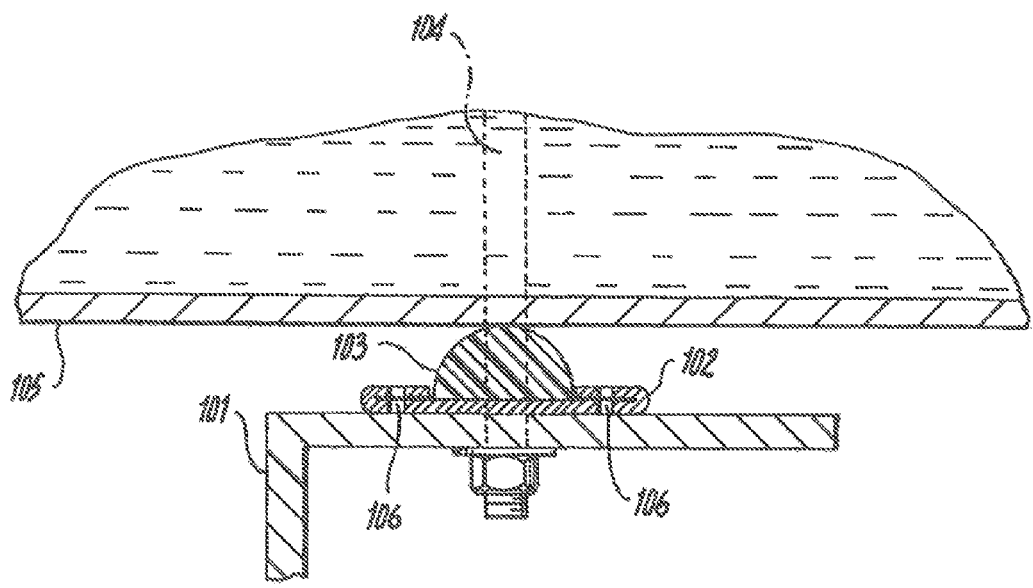
FIG. 5 illustrates a transverse sectional elevation view of an exemplary system according to one embodiment of the present disclosure.

FIG. 5 illustrates a transverse sectional elevation view of an exemplary system according to one embodiment of the present disclosure. A pipe 105 rests atop a thermoplastic rod 103 that is affixed to a corrosion resistant plate 102, the corrosion resistant plate 102 attached to a pipe support 101. Optionally, a U-bolt 104 holds the pipe 105 in place by being affixed through the thermoplastic rod 103 and corrosion resistant plate 102 around the pipe 105 and pipe support 101.

Figure 6:
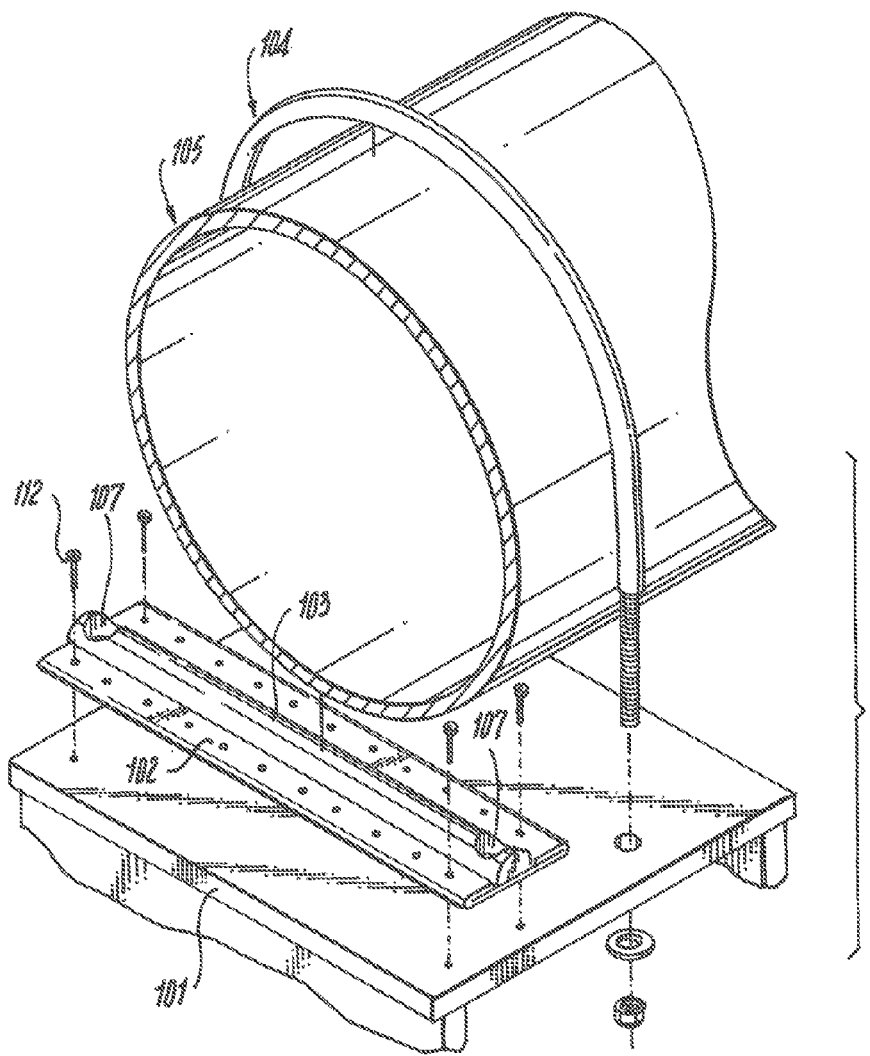
FIG. 6 illustrates an exploded perspective view of another arrangement of an exemplary system utilizing the plate embodiment of the present disclosure.

FIG. 6 illustrates an exploded perspective view of an exemplary system according to yet another embodiment of the present disclosure. According to one embodiment, a thermoplastic rod 103 having holes 107 at each end of the rod is affixed to a corrosion resistant plate 102. Holes 106 are drilled in the corrosion resistant plate 102 such that the plate 102 can be affixed using screws 112 to the pipe support 101. The holes 106 are evenly spaced along the metal plate 102. A pipe 105 rests atop the thermoplastic rod 103 and corrosion resistant plate 102 assembly, and a U-bolt 104 secures the pipe to the assembly.

FIG. 7 illustrates a perspective view of an exemplary plate and thermoplastic rod for use with the present system, according to the embodiment depicted in FIG. 9. An exemplary corrosion resistant plate 102 has holes 106 along each of its outer sides, the holes 106 equally spaced along the plate 102 by a distance D1. A thermoplastic rod 103 is affixed to the corrosion resistant plate 102.

FIG. 8 illustrates an exploded view of an exemplary plate and thermoplastic rod for use with the present system, according to the embodiment depicted in FIG. 9. A corrosion resistant plate 102 includes holes 109 down its center area for attaching the thermoplastic rod 103 thereto by using screws 110. The plate 102 is made from a single plate of corrosion resistant material, and includes a recessed area 114 (recessed in comparison to outer flaps 113) for placement of the thermoplastic rod 103. Holes 106 in the metal plate 102 are along the outer edges of the plate 102.

FIG. 9 illustrates an exploded perspective view of an exemplary system according to yet another embodiment of the present disclosure. According to one embodiment, one or more thermoplastic rods 103 are each affixed to a corrosion resistant plate 102. Holes 106 are drilled in each of the corrosion resistant plates 102 such that each of the plates 102 can be affixed using screws 112 to a pipe support 101 through holes 111 in the pipe support 101. The holes 106 are evenly spaced along each plate 102. One or more pipes 105 rest atop the thermoplastic rod 103 and corrosion resistant plate 102 assemblies.

Figure 10:
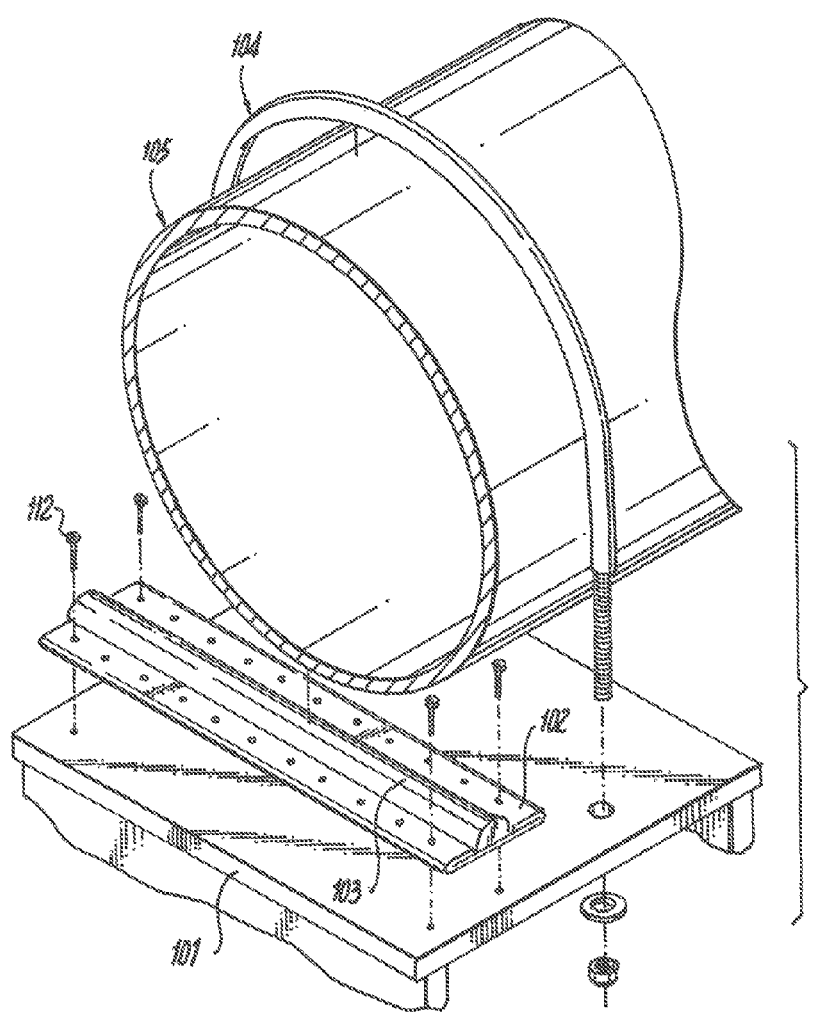
FIG. 10 illustrates an exploded perspective view of a further exemplary system, according to yet another embodiment of the present disclosure.

FIG. 10 illustrates an exploded perspective view of an exemplary system according to yet another embodiment of the present disclosure. According to one embodiment, a thermoplastic rod 103 is affixed to a corrosion resistant plate 102. Holes 106 are drilled in the corrosion resistant plate 102 such that the plate 102 can be affixed using screws 112 to the pipe support 101. The holes 106 are evenly spaced along the metal plate 102. A pipe 105 rests atop the thermoplastic rod 103 and corrosion resistant plate 102 assembly, and a U-bolt 104 secures the pipe 105 to the pipe support 101. It will be appreciated that this assembly and system differ from that disclosed in FIG. 6 in that the U-bolt 104 does not pass through the assembly of the thermoplastic rod 103 and corrosion resistant plate 102.

Figure 11:
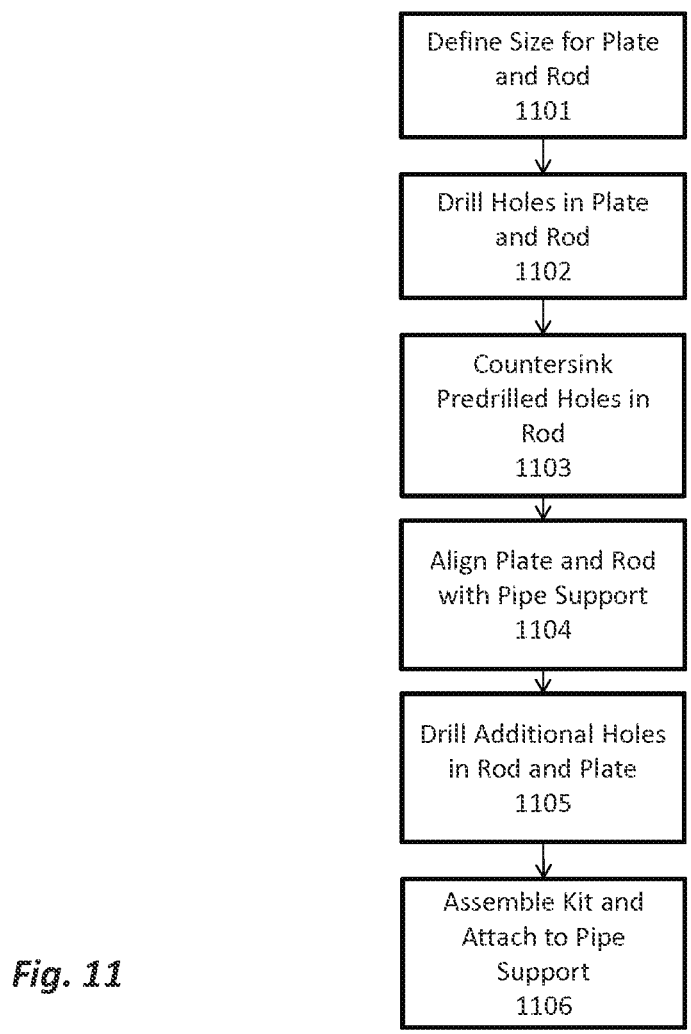
FIG. 11 illustrates an exemplary installation process for use with the present system, according to one embodiment.

FIG. 11 illustrates an exemplary installation process for use with the present system, according to one embodiment.

According to one embodiment, a size is defined for a corrosion resistant plate and thermoplastic rod 1101. Holes are drilled into the corrosion resistant plate and thermoplastic rod 1102, and predrilled holes in the thermoplastic rod are then countersunk 1103. The thermoplastic rod and corrosion resistant plate are then aligned with the pipe support 1104, and additional holes are drilled into the thermoplastic rod and corrosion resistant plate 1105 according to the alignment. The kit of the thermoplastic rod and corrosion resistant plate are then assembled and the kit is attached to the pipe support 1106.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

Attachment plates and systems for pipe support interfaces have been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

What is claimed is:

1. An attachment system for a pipe comprising: a support for the pipe, a non-compressible low-friction surface locatable between the pipe and the support, the low-friction surface having a face, a plate configured to be between the low-friction surface and the support, the plate constructed of a corrosion resistant material and containing three sets of through holes for attaching the plate to the low-friction surface and to the support, wherein the plate has a recessed area for receiving the face of the low-friction surface, a U-bolt with two ends for holding the pipe to the support;
wherein the plate has two U-bolt holes capable of receiving ends of the U-bolt, one near each end of the plate;
wherein the low-friction surface has two U-bolt holes capable of receiving ends of the U-bolt, one near each end of the low-friction surface; and
wherein the plate U-bolt holes align with the low-friction surface U-bolt holes.

2. The attachment plate of claim 1, wherein the plate has a first longitudinal end and a second longitudinal end, and wherein the recessed portion extends from the first longitudinal end to the second longitudinal end.

3. The attachment plate of claim 2, wherein the recessed portion of the plate extends about three-sevenths the width of the plate.

4. The attachment plate of claim 2, further comprising first attachment means passing through a first set of holes through the recessed area of the plate, the first attachment means capable of stationary attachment of the plate to the low-friction surface.

5. The attachment plate of claim 4, further comprising second attachment means passing through a second set of holes through the outer edge of the plate, the second attachment means capable of attaching the plate to the support.

6. The attachment plate of claim 1, wherein the low-friction surface is a semi-cylindrical rod made of durable, high-impact, extruded thermoplastic.

7. The attachment plate of claim 6, wherein the thermoplastic rod has a diameter selected from the group consisting of ¾ inch, 1 inch, and ½ inch.

8. The attachment plate of claim 1, wherein the corrosion resistant material is 14 gauge galvanized steel.

9. The attachment plate of claim 1, wherein the plate has a height of 1/16 inch.

\* \* \* \* \*